Nov. 26, 1929.    A. N. CRAMER    1,737,219
FORMING HOT GLASS INTO MOLD CHARGES
Filed Aug. 6, 1920    8 Sheets-Sheet 2
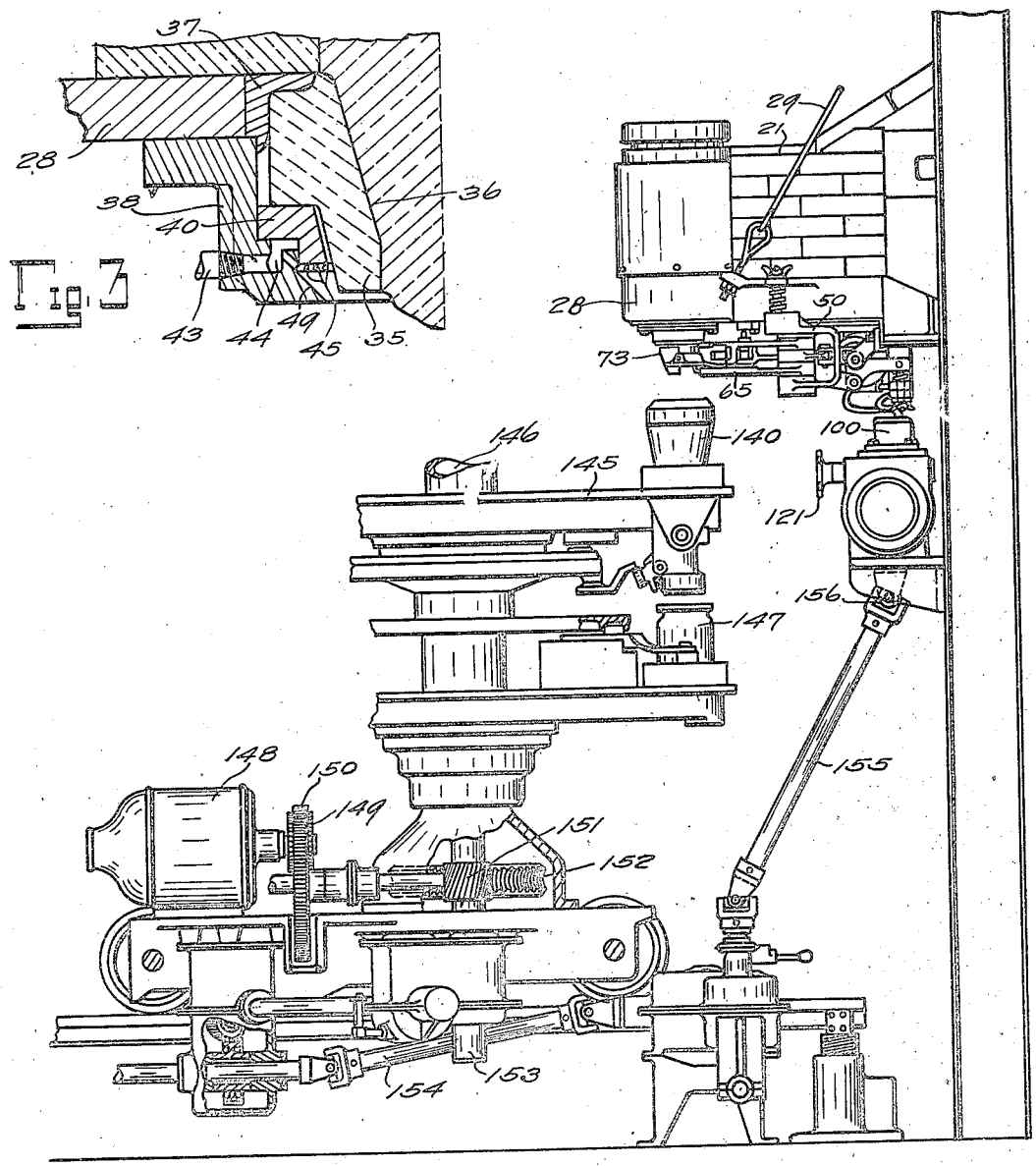
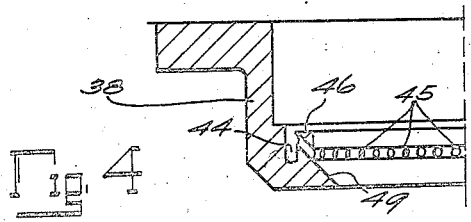
INVENTOR

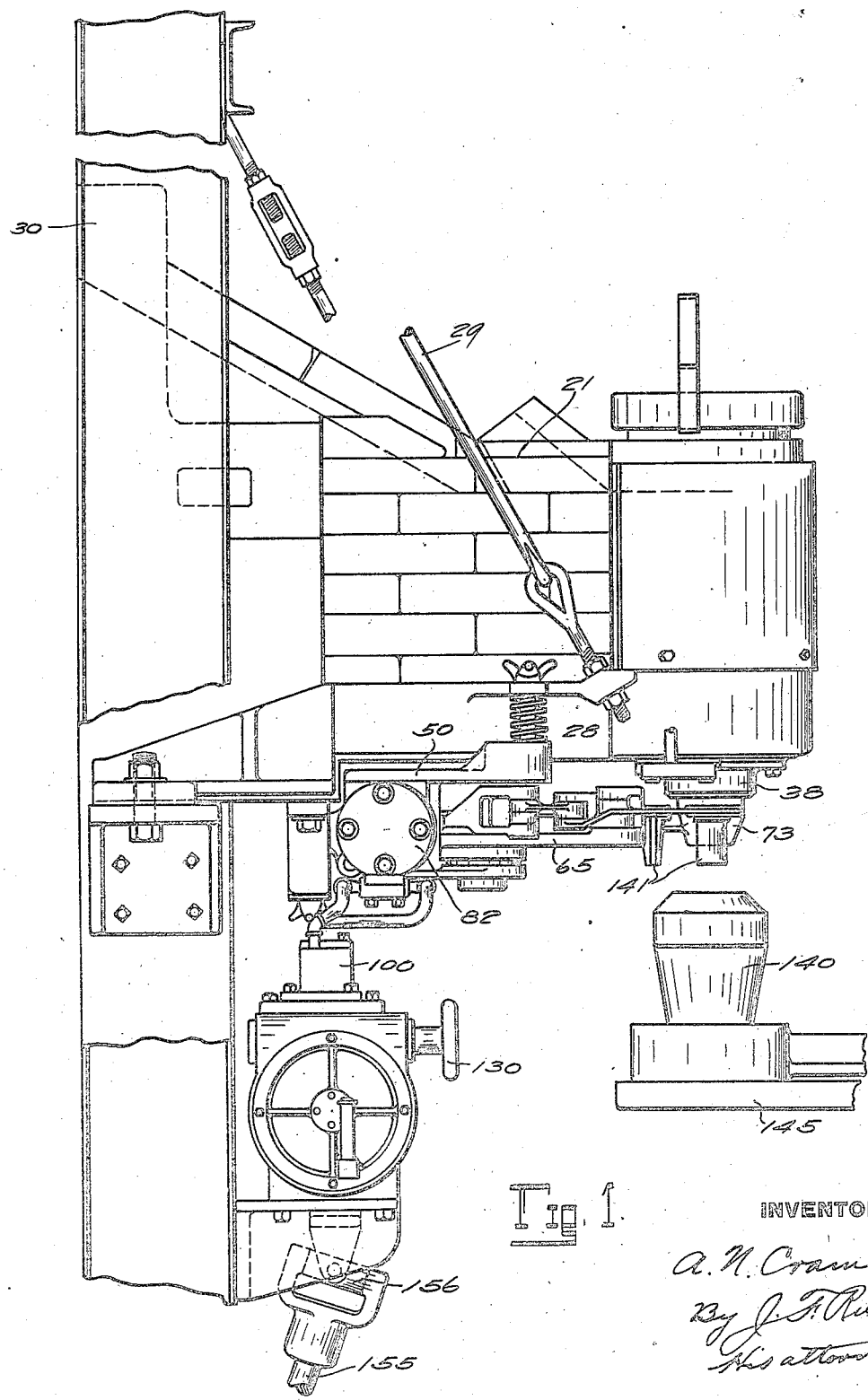

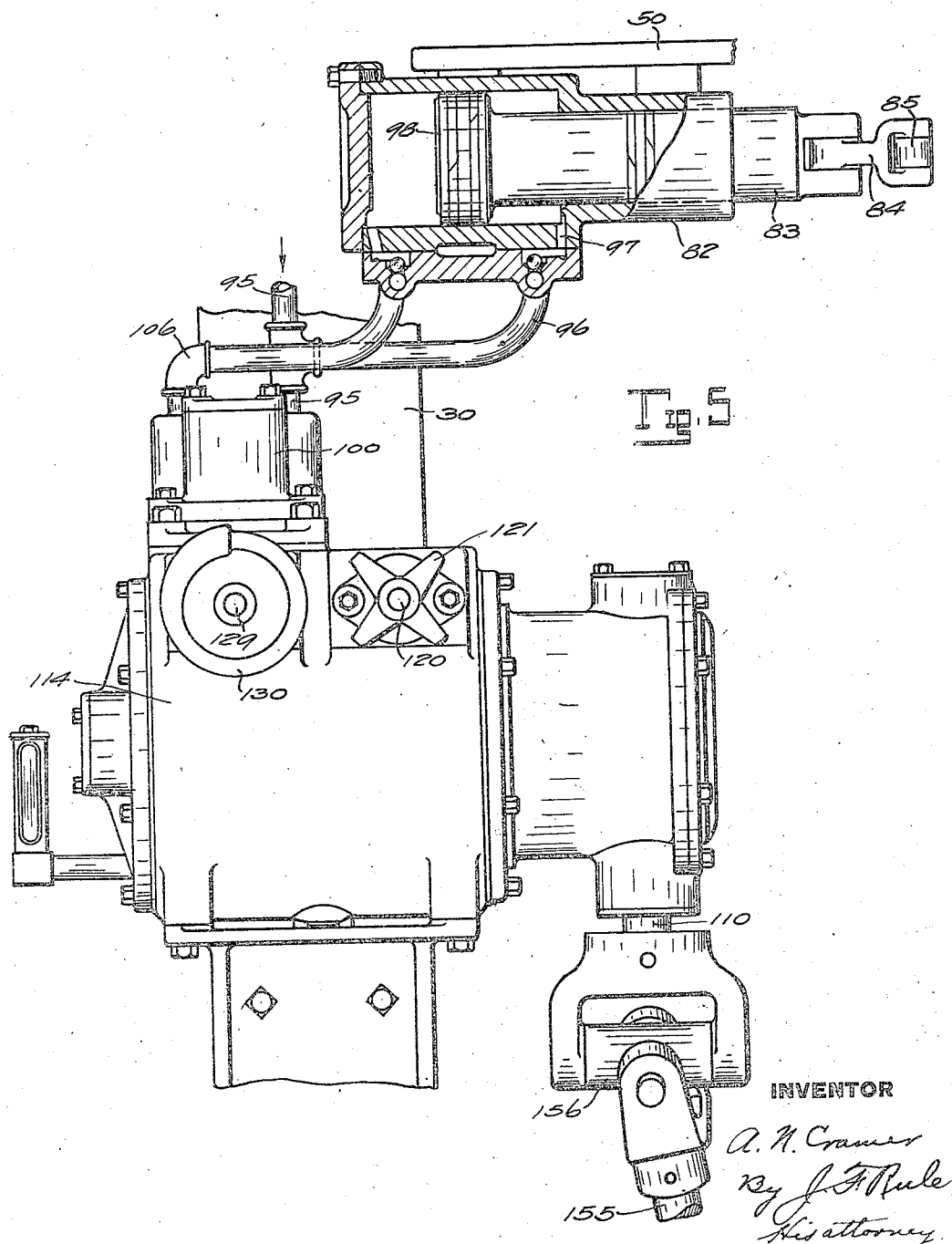

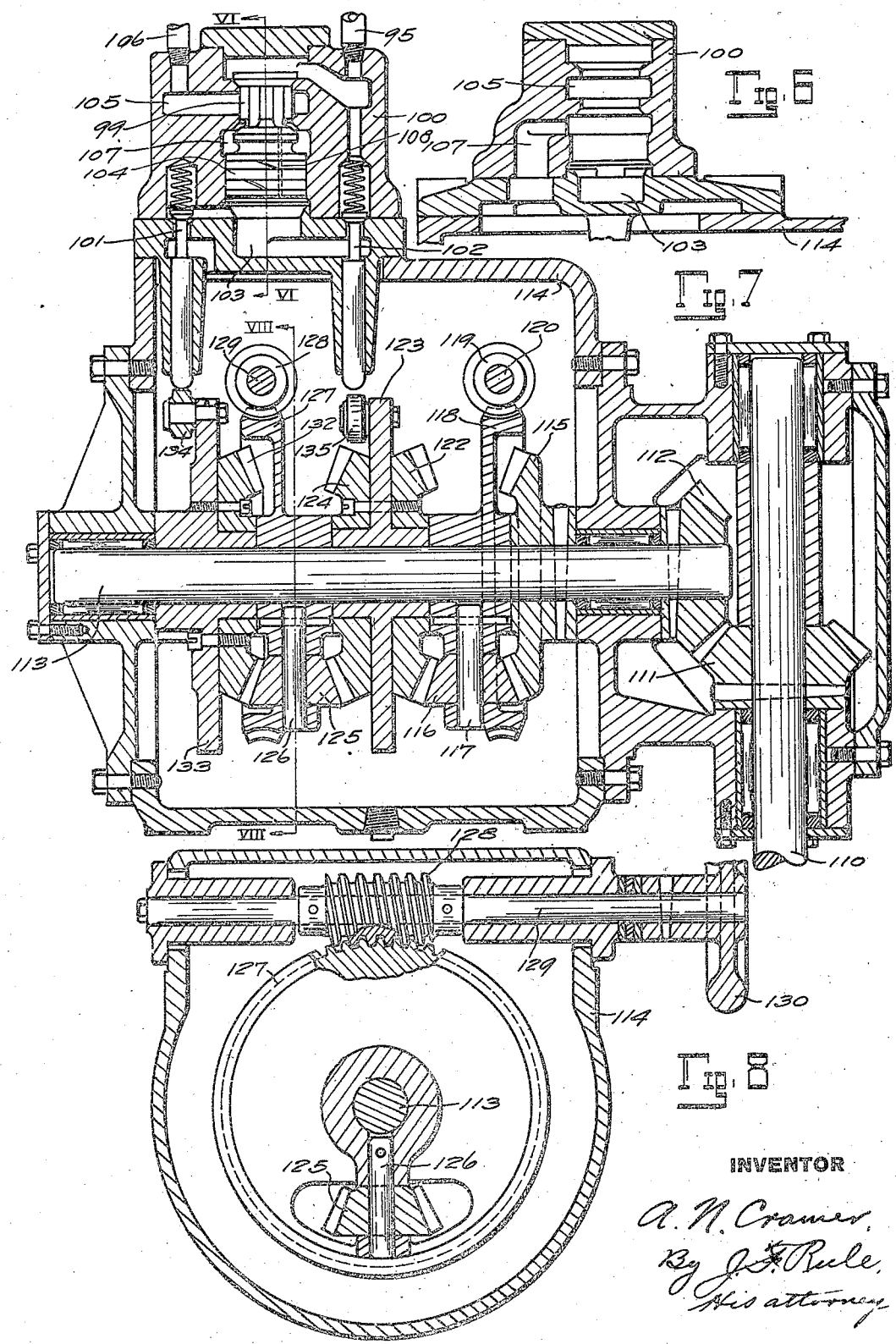

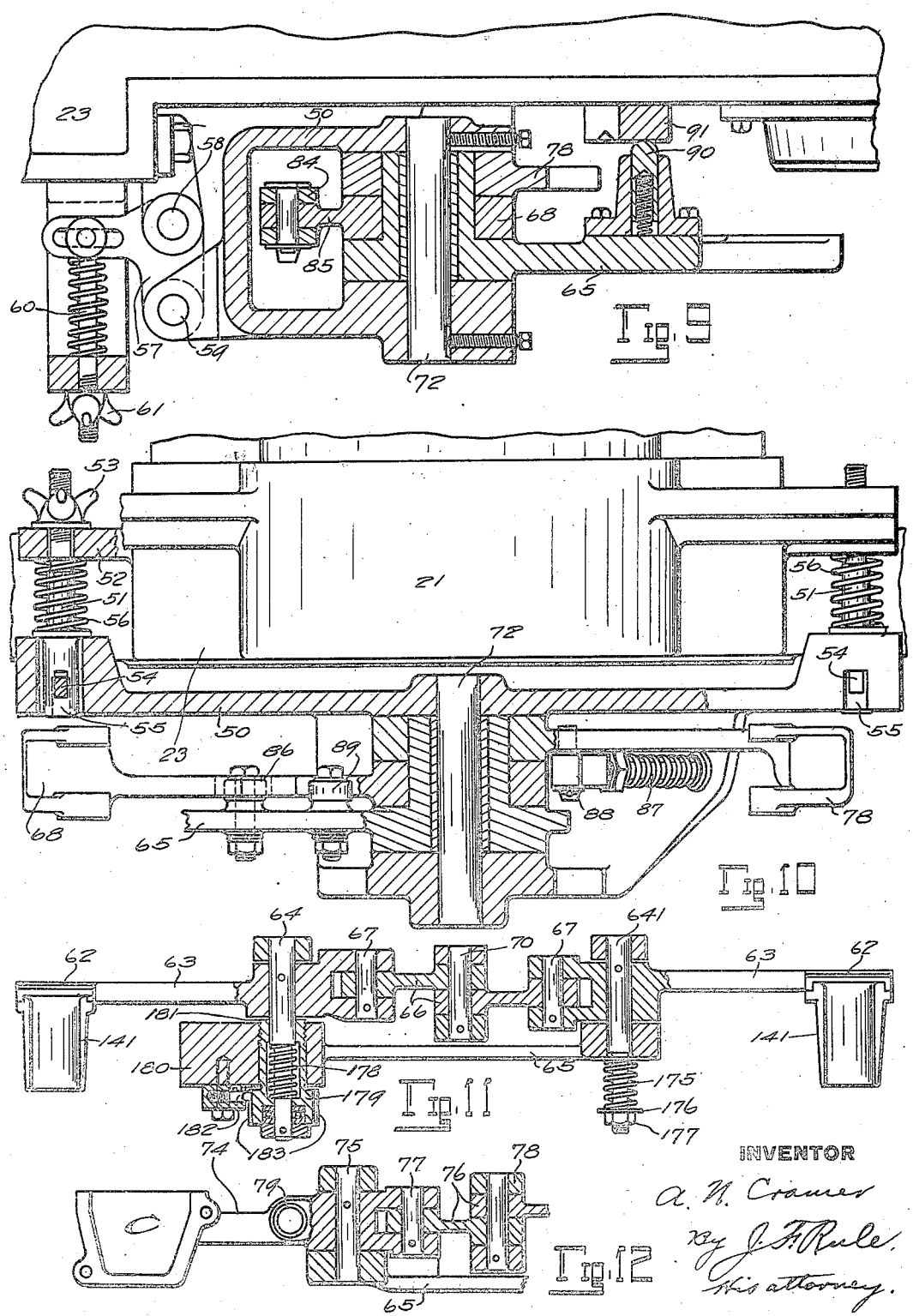

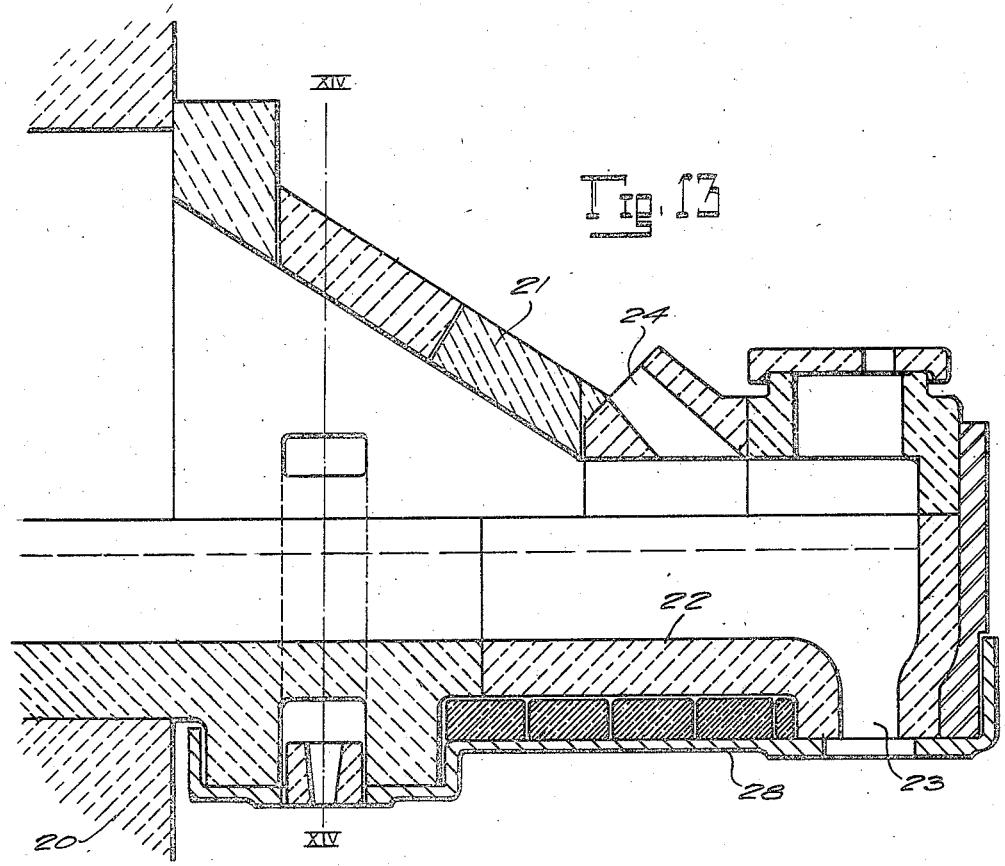
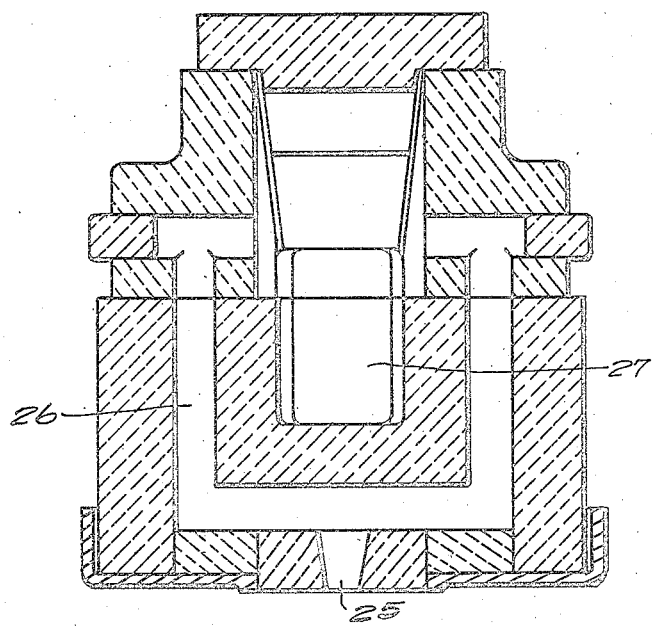

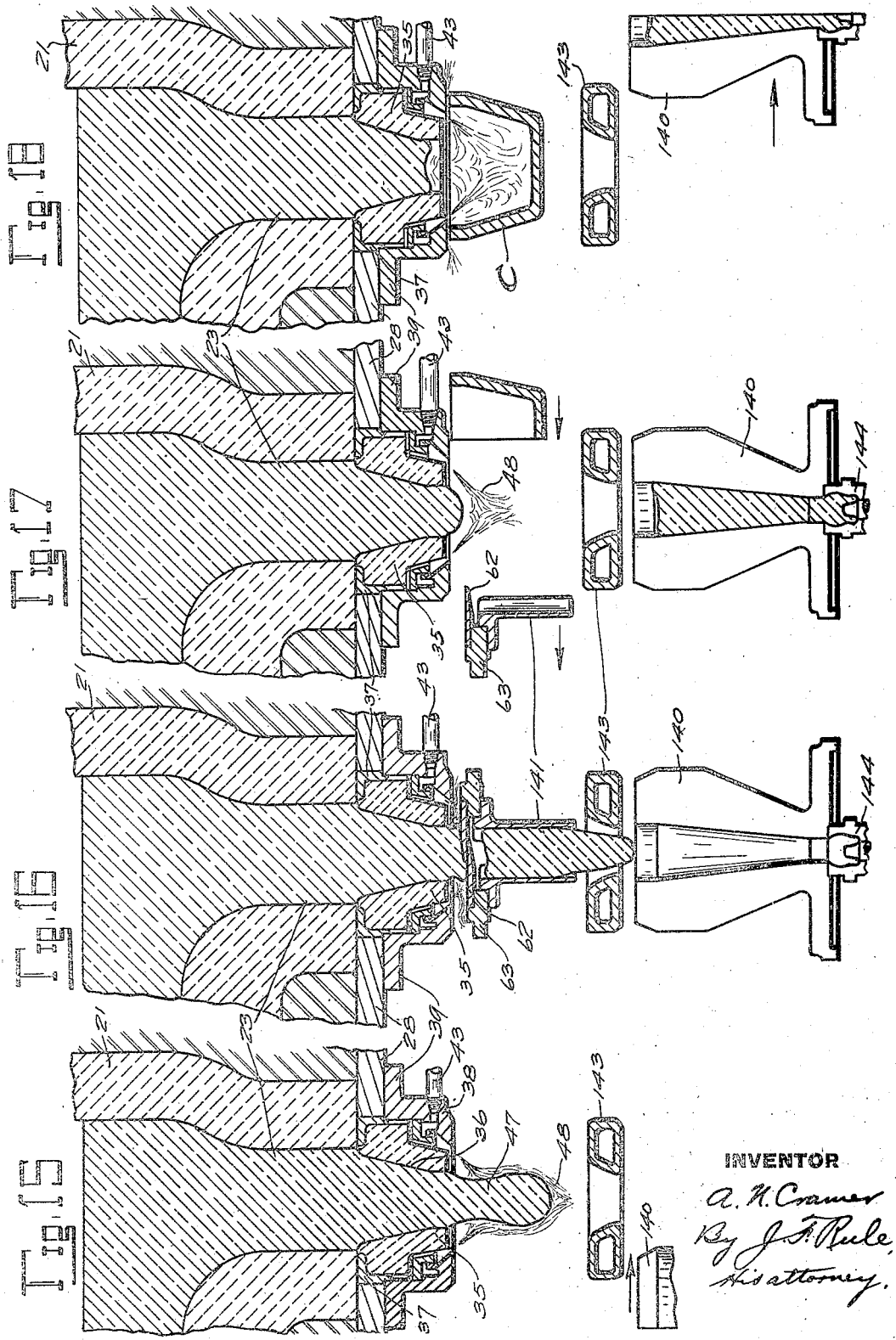

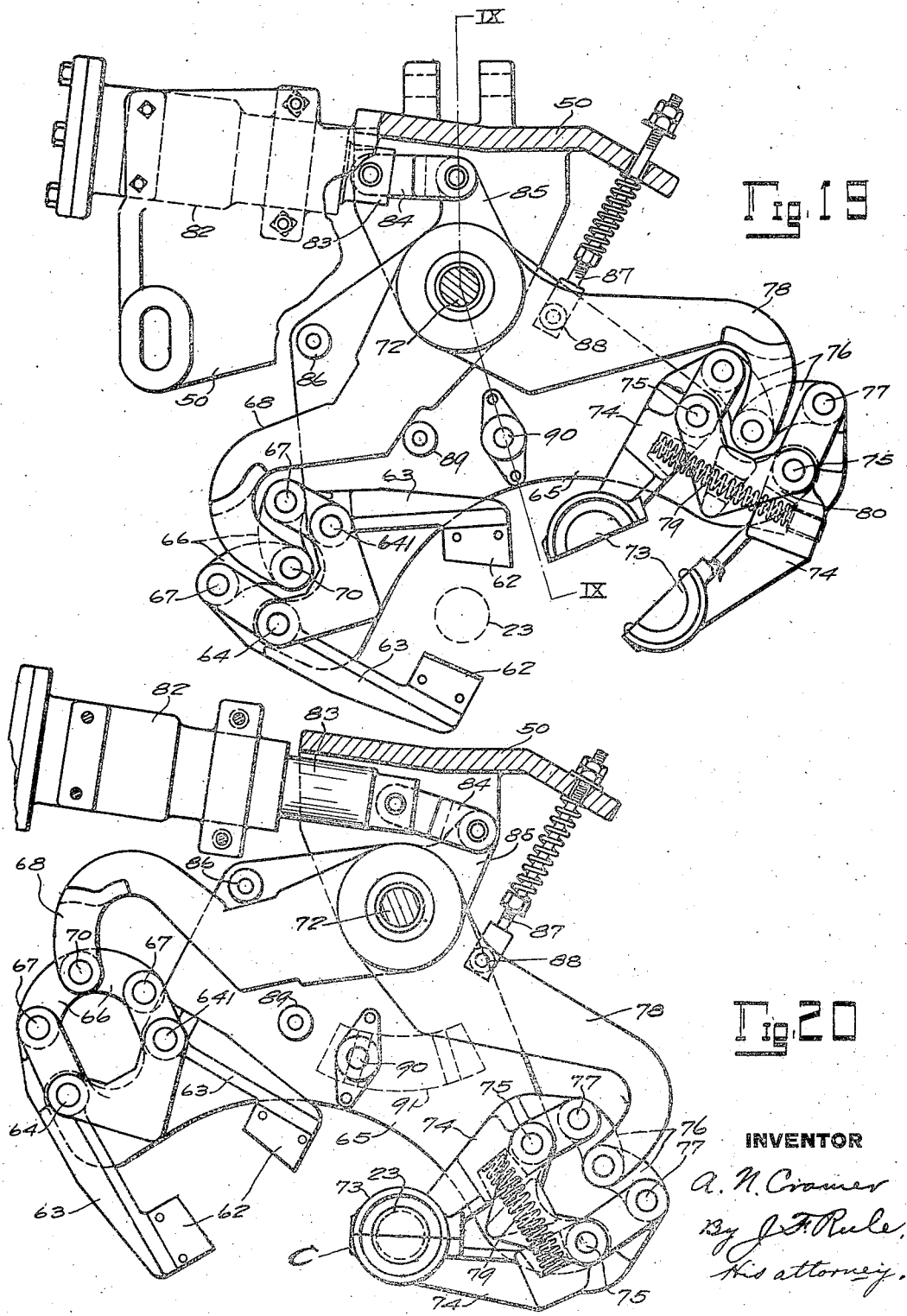

Patented Nov. 26, 1929

1,737,219

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

FORMING HOT GLASS INTO MOLD CHARGES

Application filed August 6, 1920. Serial No. 401,638.

My invention relates to a method and apparatus for producing formed mold charges or gobs of glass from a supply of molten glass. An object of the invention is to provide an improved method and mechanism by which the glass as it issues from an outlet orifice in a melting furnace or tank, is formed into gobs of suitable shape and condition for entering the molds, means being provided for surrounding and enveloping the issuing glass in a heating flame, by which the glass is completely protected from exposure to the outside air during the gob formation. Means are provided for periodically severing the glass and for supporting and controlling the shape of the issuing glass by the action of a blast flame.

In its preferred form, the invention comprises a bushing of refractory material forming the outlet orifice of the furnace and an annular burner surrounding said orifice, by which a ring of flame under a controlled pressure is caused to surround the issuing stream or column of glass. Combined with this burner is a shaping and controlling element in the form of a cup, which is automatically brought into position beneath the orifice after each cutting operation and in which the flame from the burner is confined to form a supporting cushion of burning gas enveloping and sustaining the glass issuing from the orifice.

The construction and arrangement of the burner and the bushing ring provide for a heating flame which completely surrounds the glass flowing from the orifice. The holes in the burner are arranged to direct the combustible gases downwardly in converging directions so that the flame impinges with considerable force against the sides of the stream or column of glass. In this manner cooling of the glass as it issues from the orifice is prevented and the exterior of the charge may be heated to a high degree. The flame is thus effective as a re-heating agent close to the bushing, and also serves to preclude the cooling effect of the atmosphere even above its point of contact with the stream. This impinging action of the flame is moreover, effective in reducing and controlling the size of the charge of glass.

A further feature of the invention relates to the shearing mechanism and its combination with the cup or means for retarding or stopping the flow. Such cutting means and retarding means are so coordinated and arranged that the retarding means is automatically operated a predetermined constant time interval after the cutter operates, independently of the frequency of the operation of the device as a whole, which frequency corresponds to and varies with the speed of the glass forming machine, or in other words, the number of molds brought to charging position per minute.

In the preferred form of construction, the cutter and the retarding cup are mounted on a reciprocable support by which they are brought alternately into operating position. A single motive element, as an air cylinder, is used to reciprocate said support and actuate the cup and cutter, thereby providing a simplified mechanical construction. The cutter comprises a pair of blades and a toggle link connection so arranged that an opening and closing movement of the blades is effected by a single direct movement of the actuating device, giving a quick cutting movement. Moreover, the toggle arrangement insures a maximum effective pressure or power applied to the blades at the time of cutting.

A further feature of the invention relates to the mounting of the pivoted knife arms in such manner that a resilient downward tension is applied to the pivot of the upper blade and a resilient upward tension to its mate. The arrangement is such that the blades are both uniformly tensioned. Furthermore, one of the blades is adjustable into and out of relation to its mate. This construction permits regulation of the overlap of the blades as may be required to insure proper cutting. The adjustment may readily be made after the parts are assembled, and if desired, without interrupting the operation of the cutter. This adjustment avoids the need of the usual shims or other expedients commonly employed to compensate for the reduced thickness of the cutters when ground to maintain their cutting edges.

Other features and advantages will appear hereinafter.

In the accompanying drawings, which illustrate a construction embodying the principles of my invention:

Figure 1 is a side elevation showing the furnace boot or extension and the gob forming apparatus associated therewith.

Figure 2 is an elevation viewed from the opposite side of the boot, and also showing the glass forming machine.

Figure 3 is a detail view of the ring burner and associated parts.

Figure 4 is a sectional detail of the burner.

Figure 5 is a part sectional elevation showing the air motor for operating the cutter and cup, and controlling mechanism for the motor.

Figure 6 is a section at the plane of the line VI—VI on Figure 7.

Figure 7 is a sectional elevation showing the valves controlling the air motor and the timer for the valves.

Figure 8 is a section at the plane of the line VIII—VIII on Figure 7.

Figure 9 is a section at the plane of the line IX—IX on Figure 19.

Figure 10 is a part sectional elevation looking in a direction about at right angles to that of Figure 9, and shows the means for supporting the cup and cutter mechanism.

Figure 11 is a part sectional elevation of the cutter mechanism.

Figure 12 is a detail view of a cup section and operating connections therefor.

Figure 13 is a section through the furnace boot.

Figure 14 is a section at the line XIV—XIV on Figure 13.

Figures 15, 16, 17 and 18 are sectional elevation views showing the boot, bushing and burner, and also indicating the positions of the cutters, retarding cup and blank molds at successive periods in the cycle of operations. Figure 15 shows a suspended gob just before the cutting operation. Figure 16 shows the relation of parts at the instant the cutting takes place. Figure 17 shows the cutters being retracted and the retarding cup moving into position. Figure 18 shows the cup in position.

Figure 19 is a plan view of the cutting mechanism, the retarding cup and the actuating means for said parts.

Figure 20 is a similar view with the parts in a different position.

Referring particularly to Figures 1, 2, 13 and 14, the melting tank or furnace 20 (Fig. 13) is provided with a boot or extension 21 with its floor 22 below the normal level of the glass in the furnace. The glass is discharged through a spout or passageway 23 in the floor of the boot. For heating or controlling the temperature of the glass in the boot, an opening 24 is provided in the upper wall of the boot, through which a burner may direct a flame downward against the glass. A burner may also be provided at the opening 25 in the bottom of the boot, the burning gases being directed through flues 26 surrounding the channel 27 through which the glass flows. If it is desired to reduce the temperature of the glass as it enters the boot, a current of cold air may be directed through the flues 26. The boot 21 is supported by a metal floor or framework 28. Brace rods 29 extend from the frame 28 to the I-beams 30 which form a support for the entire structure.

The annular burner by which the glass as it issues is heated and controlled, will now be described. Referring to Figures 3, 4, and 15 to 18, a bushing 35 of clay or other refractory material is located directly beneath the clay floor of the boot with its downwardly tapered opening or passageway 36 in alignment with the spout 23. A metal re-enforcing ring 37 may surmount the bushing 35. The burner comprises an annular member or ring 38 surrounding the bushing and provided with a flange 39 which abuts against the floor 28. A second metal ring 40 fits within the ring 38, being interposed between the latter and the clay bushing 35. These two rings together complete the burner. The fuel for the burner is supplied through a pipe 43 which communicates with an annular passageway 44 formed in the ring 38, the ring 40 forming the upper wall of the channel 44. An annular series of openings 45 extend diagonally downward from the channel 44 through the flange 46 of the ring 38 for directing the gases downward and inward against the glass 47 as it issues from the boot. It will be seen that this construction provides a multiplicity of openings from which jets of burning gas issue and unite to form a sheet of flame 48 surrounding and enveloping the flowing glass. The wall 49 of the ring 38 is downwardly and inwardly inclined beneath the openings 45 and assists in directing the burning gases inwardly against the glass. An annular space is formed between the wall 49 and the lower portion of the bushing 35 which space is kept at a high temperature by the burning gases. The latter also envelop the lower end of said bushing, protecting it from outside air and maintaining it at such a high temperature that there is little adhesion between the inner wall of the bushing and the glass flowing therethrough. This is of material assistance in obtaining a free flow of the glass in a large stream or column.

The flowing glass is periodically severed at a point beneath the burner to form individual masses or gobs, which are permitted to drop into the molds of a glass forming machine. After each cutting operation, a controlling device in the form of a cup C is brought beneath the outlet and co-operates with the burner to retard, control, support, shape and re-heat the glass. The apparatus for actuating the cutter and cup is shown particularly in Figures 9 to 12, 19 and 20. This mechanism is mounted on a supporting frame 50 (see Figs. 9 and 10) located beneath the furnace boot 21. The frame 50 is supported by vertical rods 51 which extend through openings in lugs 52 on the frame 23, the frame 50 being adjustable up and down by means of adjusting nuts 53. In order to readily and rapidly drop the frame 50 for accessibility in making repairs, the lower end of each rod 51 extends through an elongated opening in the frame 50 and is provided with a shoulder and a horizontal supporting wedge 54 which extends through an opening in the rod 51, said wedge being seated in a recess 55 formed in the frame 50. This construction permits a rapid unfastening of the frame 50 and it also insures a fixed location when the frame 50 is re-fastened. Springs 56 interposed between the lug 52 and the frame 50, exert a downward pressure on the latter and serve to hold it steady.

Horizontal adjustment of the frame 50 is permitted by the means shown in Figure 9, comprising a bell crank lever 57 having a stationary fulcrum 58, one arm of this lever being pivoted at 59 to the frame 50 and the other arm having a slot and pin connection with an adjusting rod 60 actuated by a thumb screw 61. This provision for horizontal adjustment permits the cutter and cup carried by the frame 50 to be moved toward and from the furnace and thereby brought into exact register with the flow opening.

The cutting mechanism comprises a pair of shear blades 62 on arms 63 pivotally supported by pivot pins 64 and 641 on a reciprocating plate 65. Toggle links 66 are connected by pivots 67 to the cutter levers 63. A cutter-operating arm 68 is connected by a pivot pin 70 to the toggle links. The arm 68 is fulcrumed to swing about a pivot pin 72 mounted in the frame 50.

Tensioning means (Fig. 11) are provided in connection with the knife arms 63 whereby the upper blade is caused to bear downwardly against the lower blade and the lower blade upwardly. Such means comprises a spring 175 mounted on the pivot pin 641 of the upper blade, said spring being held under tension between the plate 65 and a washer 176 on the pivot pin, the tension of the spring being adjustable by means of a nut 177. A spring 178 mounted on the pivot pin 64 applies an upward tension to the latter and to the knife arm 63 which is keyed to said pivot pin. The lower end of the spring 178 bears downwardly against a sleeve 179 mounted in a block 180 forming an integral part of the plate 65. The sleeve 179 has a threaded connection 181 with the block, whereby the pivot pin and attached arm 63 are adjustable up and down so that the knife blades are relatively adjustable vertically. The sleeve 179 is held in its adjusted position by a spring actuated detent 182 which engages notches 183 in the periphery of the sleeve 179. This method of adjustment permits the blades to be accurately adjusted after the parts are assembled and renders unnecessary the use of the usual shims which are ordinarily employed to adjust the knives closer together after they have been ground thinner to maintain their cutting edges.

The cup C comprises horizontally separable sections 73 carried on levers 74 connected by pivots 75 to the plate 65. Toggle links 76 pivoted to said levers at 77 are actuated by an arm 78 fulcrumed to swing about the pivot pin 72. A coil spring 79 supported in a yoke 80, bears at its ends against the levers 74.

The cup and cutting mechanism are operated by an air motor 82 mounted on the under side of the frame 50, said motor comprising a piston rod 83 connected through a link 84 to a lug or extension 85 of the knife operating arm 68.

The operation of the cutter and cup is as follows: Figure 19 shows the position of parts just before the cutting operation. The motor 82 now operates, the piston rod 83 being moved to the right. This swings the cutter arm 68 about its fulcrum 72. The toggle links 66 are thereby actuated, first moving the blades 62 together to shear the glass, and as the pivot pin 70 moves beyond the pivots 67, the cutter blades are separated. By this time the arm 68 has been brought up against a stop 86 on the plate 65 so that the continued movement of the arm 68 causes said plate to swing with it about the pivot 72. The cutter mechanism is thus moved bodily to the left beyond the flow opening and the cup sections carried inward to positions on opposite sides of and in line with the flow opening. Before the plate 65 completes its movement, the cup actuating arm 78 is arrested by a rod 87 connected at 88 to the arm 78 and having a sliding connection at its opposite end with the frame 50. The arm 78 being thus arrested, the final movement of the plate 65 causes the toggle links 76 to be straightened and close the cup sections, as shown in Figure 20. The cup C is now in position directly beneath the flow, as shown in Figure 18. The parts retain this position until the motor 82 is reversed and returns the parts to the Figure 19 position. During this return movement the arm 68 swings from the stop 86 to the stop 89, thereby moving the toggle links 66 inward. This gives an idle shearing movement to the cutters, which is merely incidental to positioning the toggle links for the next cut. Movement of the plate 65 at this time is prevented by a friction brake consisting of a spring pressed lug 90 (see Fig. 9) bearing against a block 91 and which may seat in recesses in said block. After the arm 68 strikes the stop 89 the plate 65 is swung to the right. As it commences such movement the pivots 77 are moved therewith relatively to the arm 78 and cause the cup sections to be separated. The spring 79 assists in opening the cup with a snap action. The parts are thus brought to the Figure 19 position in which they remain until the motor 82 again operates to repeat the cycle of movements above described.

The means for controlling the operation of the air motor 82 will now be described, reference being had to Figures 5 to 8 inclusive. Air under pressure is supplied through a pipe 95. A branch pipe 96 leads directly from the supply pipe to a port 97 at one end of the motor cylinder, so that there is a constant air pressure in the cylinder in front of a piston 98. The supply of air behind the piston is controlled by a valve 99 in a valve casing 100. The operation of this main valve 99 is controlled by poppet valves 101 and 102. When the valve 102 is lifted, compressed air from the pipe 95 is admitted to the air chamber 103 beneath the head 104 of the main valve, thereby lifting the valve and admitting air through a port 105 to a pipe 106 leading to the rear end of the motor cylinder behind the piston 98. The motor piston is thereby driven to the right and operates the cutter and cup in the manner above described. When the poppet valve 102 again closes the air pressure is retained in the chamber 103 and the valve piston held up until the poppet valve 101 is lifted and permits the escape of air from the chamber 103. The air pressure in the chamber 107 above the head 104 will move said head downward and with it the valve 99. The latter thereby cuts off the air supply behind the piston 98 and opens the port 105 to the chamber 107, allowing the air to escape so that said piston is driven to the left. Ball check valves 109 control the exhaust from the ends of the cylinder.

In order to control the pressure beneath the head 104 while the poppet valves are both closed, an air lock is provided by means of a small port 108 extending through the valve 99 and connecting the ports 103 and 105. When the valve 99 is in the position shown in Figure 7, air has been exhausted from beneath the head 104, and the port 105 is connected through the port 107 to free air. Air pressure is upon the top of the valve 99 seating it. Also it is upon the top of the poppet 102, seating it. Continued rotation of the disk 133 would permit the poppet 101 to seat. Any leakage of air by the valve 102 would pass to the chamber 103 and tend to raise this head 104. However, this air lock being connected with the port 105 and thus to the free air, permits this leakage to pass off. When the valve 99 is in the reverse or up position, the air lock is operative as follows: Air pressure is admitted through the poppet 102 to the head 104. This raises the valve 99 so that the pipe 95 is connected through the port 105 to the pipe 106 and, therefore, is filled with air under pressure. Any leakage of air from beneath the head 104, as for instance, leakage by the valve 101, would permit the pressure to be reduced sufficiently so that the pressure on top would force the valve 99 from its position. The air lock is adapted to prevent this by connecting the air pressure in the port 105 with the chamber below the head 104, thereby making up for any leakage of pressure therefrom.

The timing mechanism by which the poppet valves 101 and 102 are actuated at predetermined time intervals, comprises a vertical driving shaft 110 (Fig. 7) which is rotated continuously. A bevel gear 111 keyed to the shaft 110 meshes with a gear 112 keyed to a horizontal shaft 113, the latter being journalled in bearings in the ends of a gear casing 114. Keyed to the shaft 113 is a mitre gear 115 which drives a pinion 116 rotatable on a bearing pin 117 extending radially of the shaft 113. The pin 117 is keyed in a stationary element 118, the latter mounted for rotative adjustment about the shaft 113, said element, as shown, being in the form of a worm gear with which meshes a worm 119 on an adjusting shaft 120, to which is secured a hand wheel 121 (Fig. 5) externally of the casing 114. The pinion 116 runs in mesh with a bevel gear 122 rotatable about the shaft 113. The gear 122, as shown, is keyed to one side of a disk 123 journalled on the shaft. On the opposite side of said disk is keyed a gear 124, so that the parts 122, 123 and 124 are rotated as a unit. The gear 124 rotates a pinion 125 journalled on a pin 126 keyed to a worm wheel 127 adjustable rotatively about the shaft 113 by means of a worm 128 on an adjusting shaft 129 journalled in the casing 114 and provided with a hand wheel 130 (Figs. 5 and 8) outside of the casing. A bevel gear 132 runs in mesh with the pinion 125, said gear being fixed to a disk or member 133 rotatively mounted on the shaft 113. A roller 134 carried on the disk 133 lifts the poppet valve 101 once during each complete rotation of the shaft 113. A roller 135 on the disk 123 operates in like manner to actuate the valve 102.

The operation of the timing device is as follows: The shafts 110 and 113 rotate continuously and at the same angular velocity, making one complete rotation during each cycle of operations of the gob forming mechanism. The gear 115 rotating with the shaft 113 operates through the pinion 116 to rotate the element comprising the parts 122, 123 and 124 about the shaft 113 in the opposite direction from that in which said shaft is rotating, and at the same angular speed. The gear 124 operates through the pinion 125 to drive the gear 132 in the opposite direction from that in which the gear 124 rotates, or in other words, in the same direction as the shaft 113 and at the same speed. It will thus be seen that for each complete rotation of the shaft 110 the valve operating rolls 135 and 134 are given a complete revolution about the axis of the shaft 113 and operate their respective poppet valves once during such revolution. The timing of the valves 101 and 102 may be adjusted by rotating the hand wheels 130 and 121. Thus, by rotating the hand wheel 130, the worm gear 127 is rotated about the shaft 113, causing the pinion 125 to roll on the gear 124 and thereby rotate the member 133 on the shaft 113. In this manner the valve operating roll 134 may be adjusted to actuate the valve at any predetermined time during the revolution of the shaft 113. The hand wheel 121 operates in like manner to adjust the position of the valve actuating roll 135 relative to the shaft 113. It will be noted that these adjustments may be made while the apparatus is in operation.

The gobs of glass when severed from the oncoming stream, as shown in Figures 16 and 17, drop directly into the blank molds 140 of the glass forming machine. Forming elements or shields 141 are mounted on the cutter arms 63 in position to surround the gob of glass as the latter is severed and serve to guide the glass in its downward movement, and may have more or less of a compressing and shaping action on the glass. The gobs drop through stationary guiding rings or funnels 143 directly beneath the flow opening. The molds 140, as shown, are inverted blank molds registering with neck molds 144 in which the necks of the bottles are formed. The molds 140 are mounted on a mold carriage 145 (Fig. 2) rotatable about the center column 146 of the forming machine. The blanks after being formed in the molds 140 are swung down into finishing molds 147 in which the blanks are blown to their finished form.

The mold carriage may be rotated by a motor 148 operating through gears 149, 150, 151 and 152. The gear 152 is keyed to the center shaft 153 of the machine and said shaft operates through a train of gears to drive the shafts 154 and 155, the latter being connected through a universal joint 156 (see Fig. 5) to the drive shaft 110 (Fig. 7). The molds 140 are successively brought into glass receiving position beneath the flow outlet, the gob forming and severing mechanism being adjusted to discharge a gob into each mold.

Referring now to Figures 15 to 18, it will be seen that the burning gases issuing from the annular burner provide a sheet of flame completely surrounding and enveloping the glass protruding below the bushing 35. The pressure of the converging jets of gas on the gob may be sufficient to reduce the diameter of the flowing glass and assist in rounding and shaping the stub end from which a gob has been severed. After the gob has been formed, as indicated in Figure 15, the cutters operate to sever the same and permit it to drop into the mold. The cutters have a quick action and are immediately withdrawn, leaving the glass protruding a slight distance below the bushing 35, as indicated in Figure 17. As the cutters withdraw, the cup C is brought into position beneath the bushing (Fig. 18). As the cup is against or close to the burner ring 38 the flame from the burner is confined by the cup and exerts a substantial upward pressure on the stub end of the glass. This may be sufficient to force the glass upward within the bushing, as indicated in Figure 18, and serves to completely re-melt the glass which may have been chilled by the cutter. The glass may commence its downward flow while the cup is still in position, but is prevented from coming in contact with the walls of the cup, owing to the pressure of the enveloping burning gases. It is not always necessary to use the part 38 as a burner, as it has been found in practice that under certain conditions and for making certain kinds of ware, entirely satisfactory results are obtained by supplying cold air through the ring 38. This air in combination with the cup provides a controlling and supporting means for the glass, whereby the latter is sustained and the flow checked or stopped for any length of time required; depending on the time intervals between the bringing of successive molds to charging position.

Modifications may be resorted to within the spirit and scope of my invention.

What I claim is:

1. The combination with a container for molten glass, having an outlet orifice in the bottom thereof, of a cup comprising separable sections horizontally movable into and out of position beneath said orifice, and means to supply a heating flame downwardly into the cup through the upper end thereof when the cup is in position beneath the orifice, under sufficient pressure to support the glass.

2. The combination with means for flowing glass, of a device for severing the glass, a device for retarding the flow after each severing operation, a motor for operating said severing and retarding devices, a driving element operative to periodically effect the operation of the motor at time intervals determined by the speed of the driving element, said motor being operative to effect such operation of the retarding device at a predetermined constant time interval after the operation of the severing device irrespective of variations in the time interval between successive operations of said severing device.

3. The combination with means for flowing glass, of a severing device, a retarding device, a piston motor, a driving element operable to effect the actuation of said motor at predetermined time intervals determined by the speed of the driving element, and connections between said motor and said devices by which a single operation of the motor causes said devices to operate in succession in a predetermined time relation independent of the time intervals between the operations of the motor.

4. The combination with a container for molten glass, having an outlet through which the glass is discharged, of a severing device comprising shear blades, a retarding device including a cup having horizontally separable sections, a carrier on which said devices are mounted, means to move said carrier back and forth horizontally to move the cutter and retarding device alternately to operative position beneath the outlet, means to operate the shear blades when in said position beneath the outlet, and means to move the cup sections together when they have been moved by the carrier to said operative position.

5. The combination with a container for molten glass, having a flow opening in the bottom thereof, of a severing device comprising a pair of levers and blades mounted thereon, a retarding device comprising separable cup sections, a horizontally movable carrier on which said devices are mounted, a piston motor connected to actuate said carrier and thereby move the cutter blades and the cup sections alternately into position beneath the flow opening, and means for actuating said devices when in said position.

6. The combination of means for flowing glass, a cutting device, a retarding device, a piston motor, and operating connections between the motor and said devices whereby the movement of the motor piston in one direction actuates the cutting device to cut the glass and withdraws it from the path of the glass, shifts the retarding device into operative position and brings it into operation, and whereby the movement of the motor piston in the reverse direction withdraws the retarding device and renders it inoperative.

7. The combination of means for flowing glass, a cutting device, a retarding device operable to retard the flow by pneumatic pressure applied to the glass, a piston motor, operating connections between the motor and said devices whereby said devices are brought alternately into operative relation to the flowing glass and whereby the movement of the motor piston in one direction operates the cutting device to cut the glass and then brings the retarding device into operation, the retarding device being rendered inoperative by a movement of the motor piston in a reverse direction, valves separately controlling said movements of the piston, means for periodically actuating the valves at predetermined time intervals, and adjusting means for timing the operation of one valve relative to the other valve.

8. The combination with means for flowing glass, of a cutting device operable to periodically sever charges of glass, a retarding device by which pneumatic pressure is periodically applied to the flowing glass and the flow is thereby periodically retarded, a motor comprising a reciprocating driving element operable by its movement in one direction to actuate said devices, and by its movement in the reverse direction to render the retarding device inoperative, valves separately controlling said movements, a continuously rotating element, valve actuating devices rotated thereby and arranged to operate the respective valves, and means for adjusting the rotative position of one of said valve actuating devices through any desired angle, said adjusting means operable while said driving element is in operation.

9. The combination with means for flowing glass, of means for separating the glass into individual masses comprising a cutter device and a retarding device, a piston motor, operating connections between the motor piston and said devices for actuating said devices by a movement of the piston in one direction and silencing the retarding device by a movement of the piston in the reverse direction, valves controlling the movements of the piston, a continuously rotating drive shaft, valve actuating devices mounted to rotate about the axis of said shaft and each operable once during a complete rotation to actuate its associated valve, a train of gears driven by said shaft comprising a gear connected to one of said devices and rotatable about said axis at the same angular speed as the shaft but in the reverse direction, a gear connected to the other valve actuating device, and an idler pinion between said two last mentioned gears whereby said last mentioned valve actuating device is rotated with said shaft and at the same angular speed, and adjusting means comprising a stationary element on which said pinion is mounted and means for rotatively adjusting said element about said shaft.

10. The combination of means for flowing glass, a severing device, a retarding device comprising separable cup sections, a reciprocating piston motor having operating connections with said devices and operable by a movement of the motor piston in one direction to actuate the severing device, withdraw it from the path of the flowing glass and move the cup sections together into retarding position, and operable by a movement of the piston in the reverse direction to separate the cup sections; and adjusting means to vary the time interval between successive movements of the piston in opposite directions independently of the time interval between successive movements of the piston in the same direction.

11. The combination with means for flowing glass, of a device for severing the glass, a device for retarding the flow by pneumatic pressure applied to the glass after each severing operation, a motor for operating said severing and retarding devices, a driving element operative to periodically effect the operation of the motor at time intervals determined by the speed of the driving element, said motor being operative to effect such operation of the retarding device at a predetermined constant time interval after the operation of the severing device irrespective of variations in the time interval between successive operations of said severing device.

12. The combination of means for flowing glass, a cutting device, a pneumatic retarding device, a piston motor, and operating connections between the motor and said devices whereby the movement of the motor piston in one direction actuates the cutting device to cut the glass, shifts the retarding device into operative position and brings it into operation, and whereby the movement of the motor piston in the reverse direction withdraws the retarding device and renders it inoperative.

13. The combination of means for flowing glass, a severing device, a pneumatic retarding device, and a piston motor operable to periodically actuate the severing device and thereafter actuate the retarding device and cause a pneumatic retarding pressure to be applied to the glass, said motor being operable to maintain a constant time interval between the severing action and the actuation of the retarding device, independently of variations in the time intervals between successive severing actions.

14. The combination of a container for molten glass having an outlet opening in the bottom thereof through which the glass issues, a pneumatic retarding device, a cutter, and a piston motor operable automatically to periodically actuate the cutter and sever the glass at a plane below the outlet, withdraw the cutter from the path of the glass and thereafter actuate the retarding device to apply a pneumatic retarding pressure to the glass, said motor operating to maintain a constant time interval between the severing action and said actuation of the retarding device, independently of variations in the time intervals between successive severing actions.

15. The combination of a container for molten glass having an outlet opening in its bottom through which the glass issues, shears arranged to sever the glass at a plane spaced below the outlet, a retarding cup movable into operative position beneath the outlet, means for creating pneumatic pressure within the cup when in said position, a piston motor, means to periodically actuate the motor, and operating connections between the motor, the cutter and the retarding cup by which the cup is brought into said operative position by the motor a predetermined time interval after the operation of the cutter.

16. The combination of a container for molten glass having an outlet opening in its bottom through which the glass issues, shears arranged to sever the glass at a plane spaced below the outlet, a retarding cup movable into operative position beneath the outlet, means for creating pneumatic pressure within the cup when in said position, a piston motor, means to periodically actuate the motor, operating connections between the motor, the cutter and the retarding cup by which the cup is brought into said operative position by the motor a predetermined time interval after the operation of the cutter, independently of variations in the time intervals between successive cutting operations, said motor being operative also to withdraw the retarding cup, and adjusting means by which the time interval between the movements of the cup to and from operative position may be adjusted.

Signed at Toledo, in the county of Lucas and State of Ohio, this 30th day of July, 1920.

ALBERT N. CRAMER.